United States Patent
Shih

(10) Patent No.: US 10,762,024 B2
(45) Date of Patent: Sep. 1, 2020

(54) SIGNAL TRANSMISSION DEVICE AND SIGNAL TRANSMISSION METHOD

(71) Applicants: Inventec (Pudong) Technology Corporation, Shanghai (CN); INVENTEC CORPORATION, Taipei (TW)

(72) Inventor: Chen-Hsiang Shih, Taipei (TW)

(73) Assignees: INVENTEC (PUDONG) TECHNOLOGY CORPORATION, Shanghai (CN); INVENTEC CORPORATION, Taipei (TW)

(*) Notice: Subject to any disclaimer, the term of this patent is extended or adjusted under 35 U.S.C. 154(b) by 52 days.

(21) Appl. No.: 16/166,786

(22) Filed: Oct. 22, 2018

(65) Prior Publication Data

US 2019/0361834 A1  Nov. 28, 2019

(30) Foreign Application Priority Data

May 25, 2018 (CN) .......................... 2018 1 0516854

(51) Int. Cl.
G06F 13/40 (2006.01)
G06F 1/26 (2006.01)
G06F 13/42 (2006.01)
H02M 3/158 (2006.01)
H04L 12/10 (2006.01)
H04L 12/40 (2006.01)
H04L 12/02 (2006.01)

(52) U.S. Cl.
CPC .......... *G06F 13/4072* (2013.01); *G06F 1/266* (2013.01); *G06F 13/4221* (2013.01); *H02M 3/1582* (2013.01); *H04L 12/10* (2013.01); *G06F 2213/0026* (2013.01)

(58) Field of Classification Search
CPC .. G06F 13/4072; G06F 1/266; G06F 13/4221; G06F 2213/0026; H02M 3/1582; H04L 12/40045
See application file for complete search history.

(56) References Cited

U.S. PATENT DOCUMENTS

2013/0089125 A1* 4/2013 Kim .................... H04L 12/2801
                                                    375/222
2015/0012763 A1* 1/2015 Cohen ................. H04L 67/125
                                                    713/310

(Continued)

*Primary Examiner* — Ahmed A Berhan
(74) *Attorney, Agent, or Firm* — Muncy, Geissler, Olds & Lowe, P.C.

(57) ABSTRACT

A signal transmission device adapted to a camera includes a power input port, a boost converter, an Ethernet power circuit and a signal conversion circuit. The power input port is configured to receive an input power. The boost converter is configured to convert the input power to a boost power. The Ethernet power circuit is configured to output a DC power to the camera according to the boost power and to receive a data signal generated by the camera. The signal conversion circuit has a first interface electrically connected to the Ethernet power circuit and a second interface electrically connected to an operating system. The signal conversion circuit is configured to receive the data signal through the first interface and convert a format of the data signal, and further configured to transmit the converted data signal to operating system through the second interface.

6 Claims, 3 Drawing Sheets

(56) References Cited

U.S. PATENT DOCUMENTS

2016/0197732 A1\* 7/2016 Burnett .................. H02J 7/007
  320/137
2017/0123470 A1\* 5/2017 Srivastava .............. G06F 1/266

\* cited by examiner

SIGNAL TRANSMISSION DEVICE AND SIGNAL TRANSMISSION METHOD

CROSS-REFERENCE TO RELATED APPLICATIONS

This non-provisional application claims priority under 35 U.S.C. § 119(a) on Patent Application No(s). 201810516854.3 filed in China on May 25, 2018, the entire contents of which are hereby incorporated by reference.

TECHNICAL FIELD

The disclosure relates to a signal transmission device and a signal transmission method, more particularly to a signal transmission device and a signal transmission method adapted to a camera based on techniques of Ethernet transmission.

BACKGROUND

In general, a camera serves as a terminal device of a robot. An interface of a camera can be a USB interface or a PoE interface. The camera with the USB interface is applied to computer products while the camera with the PoE interface is applied to the security control industry. Currently, circuit boards of public versions included in a system, provided by some manufacturers, are equipped with USB interfaces (e.g. USB 2.0/3.0) for peripheral devices.

Due to differences of interfaces, a camera equipped with a PoE interface such as IP CAM is not compatible with a circuit board equipped with a USB interface for peripheral devices. As a result, there are difficulties in designing and applying products. Since increasingly importance has been attached to the development of the security control industry, it is important to provide compatibility between a system including a circuit board equipped with USB 2.0/3.0 and a camera equipped with a PoE in the security control industry so as to increase multiusability of products in the relevant field.

SUMMARY

A signal transmission device adapted to a camera is disclosed according to one embodiment of the present disclosure. The signal transmission device includes a power input port, a boost converter, an Ethernet power circuit and a signal-conversion circuit. The power input port is configured to receive an input power. The boost converter is electrically connected to the power input port and configured to convert the input power to a boosted power. The Ethernet power circuit is electrically connected to the boost converter. The Ethernet power circuit is configured to receive the boosted power so as to output a DC power to the camera and configured to receive a data signal generated by the camera. The signal-conversion circuit has a first interface and a second interface. A type of the first interface is different from a type of the second interface. The first interface is configured to be electrically connected to the Ethernet power circuit, and the second interface is configured to be electrically connected to a working system. The signal-conversion circuit is configured to receive the data signal through the first interface and convert a format of the data signal. The signal-conversion circuit is further configured to send the data signal with the format converted to the working system through the second interface.

A signal transmission method adapted to a camera is disclosed according to one embodiment of the present disclosure. The signal transmission method includes the following steps: receiving an input power by a power input port; converting the input power into a boosted power by a boost converter electrically connected to the power input port; receiving the boosted power so as to output a DC power to the camera and receiving a data signal from the camera by an Ethernet power circuit electrically connected to the boost converter; receiving the data signal by a first interface of a signal-conversion circuit, with the first interface electrically connected to the Ethernet power circuit, wherein a format of the data signal is converted by the signal-conversion circuit; and sending the data signal with the format converted to a working system through a second interface of the signal-conversion circuit, with the second interface electrically connected to the working system, wherein a type of the first interface is different from a type of the second interface.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Figure 1:
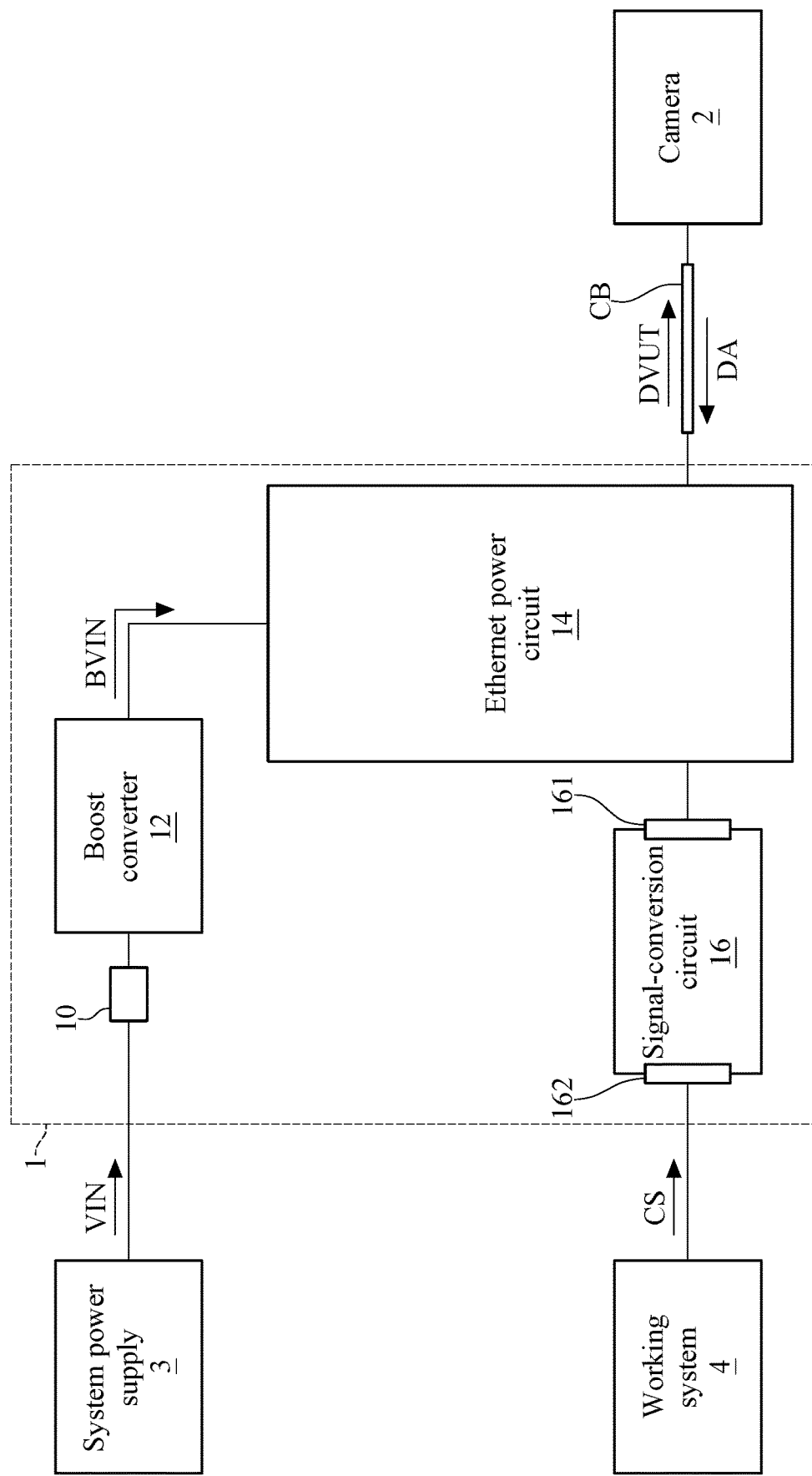
FIG. 1 is a block diagram of a signal transmission device according to one embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which is a block diagram of a signal transmission device according to one embodiment of the present disclosure. As shown in FIG. 1, the signal transmission device 1, adapted to a camera 2, includes a power input port 10, a boost converter 12, an Ethernet power circuit 14 and a signal-conversion circuit 16. The power input port is configured to receive an input power INV. The boost converter 12 is electrically connected to the power input port 10 and configured to convert the input power VIN into a boosted power BVIN. In practice, as shown in FIG. 1, the power input port 10 is configured to receive the input power INV from a system power supply 3. In one embodiment, the system power supply 3 is a DC power supply which providing a constant voltage. For example, the system power supply 3 provides an input power VIN of 19 volts in a DC form and the power input port 10 transmits the input power VIN to the boost converter 12. In one embodiment, the boost converter 12 is a DC to DC boost converter adapted for boosting a voltage of the input power VIN to form the boosted power BVIN. For example, the boost converter 12 boots the input power of 19 volts to form the boosted power BVIN of 48 volts.

The Ethernet power circuit 14 is electrically connected to the boost converter 12 and configured to receive the boosted power outputted by the boost converter 12 so as to output a DC power DVUT to the camera 2. In other words, the Ethernet power circuit 14 is capable of outputting the DC power DVUT which is adapted to the camera 2 according to the boosted power BVIN received. In an example, the camera 2 is an IP CAM serving as an external device. The Ethernet power circuit 14 is not only configured to output the DC power DVUT to the camera 2, but also configured to receive a data signal DA generated by the camera 2. In this embodiment, the camera 2 is a photography device with a PoE function. Specifically, an Ethernet cable CB is connected between the Ethernet power circuit 14 and the camera 2, and the Ethernet cable CB can be, for example, a RJ45 cable. Since the Ethernet cable CB has a capability of transmitting power and data, the camera 2 not only receives a power through the Ethernet cable CB, but also sends image data (namely "data signal DA") to the Ethernet power circuit 14 through the Ethernet cable CB.

In this embodiment, the Ethernet power circuit 14 sends the data signal DA to a working system 4 via a signal-conversion circuit 16. Specifically, the signal-conversion circuit 16 has a first interface 161 and a second interface 162. The first interface 161 is configured to be electrically connected to the Ethernet power circuit 14, and the second interface 162 is configured to be electrically connected to the working system 4. A type of the first interface 161 is not identical to a type of the second interface 162. The signal-conversion circuit 16 is configured to receive the data signal DA from the Ethernet power circuit 14 via the first interface 161. The data signal DA is the image data which is captured by the camera 2. Further, the signal-conversion circuit 16 converts a format of the data signal DA and sends the data signal DA, which format is converted, to the working system 4 via the second interface 162. In practice, the signal transmission device 1 and the working system 4 can be included in a computer server serving as a system end while the camera 2 serves as an external device to be connected to the system end. In one example, the working system 4 is a main processing center including a CPU in a computer, and the signal transmission device 1 is configured to provide power and transmit data to the working system 4 and the camera 2. In an implementation, the signal-conversion circuit 16 is an integrated circuit having different transmission interfaces, such as the chip of Intel i350.

In one embodiment, the first interface 161 is an Ethernet transmission interface, and the second interface 162 is a PCIe transmission interface. In other words, the communication between the signal-conversion circuit 16 and the working system 4 is performed based on the techniques of PCIe transmission, and the communication between the signal-conversion circuit 16 and the Ethernet power circuit 14 is performed based on the techniques of Ethernet transmission. In one example, the signal-conversion circuit 16 has a function of converting a format of a signal. The signal-conversion circuit 16 is adapted for converting the data signal DA with an Ethernet format, received through the first interface 161, into the data signal DA with a PCIe format. The signal-conversion circuit 16 further outputs the data signal DA with the PCIe format through the second interface 162.

In one embodiment, the signal-conversion circuit 16 is configured to receive a control signal CS from the working system 4 via the second interface 162 and further sends the control signal CS to the Ethernet power circuit 14 via the first interface 161 so as to control an operation of the camera 2. Specifically, the working system 4 (e.g. a processor in the working system 4) generates the control signal CS and sends the control signal CS to the Ethernet power circuit 14 via the signal-conversion circuit 16, and then the Ethernet power circuit 14 further sends the control signal to the camera 2 for a control operation. For example, the control operation involves adjustments of lens directions or focal lengths of the camera 2. Different from the aforementioned embodiment, in this embodiment, the signal-conversion circuit 16 converts the control signal CS with a PCIe format, received from the working system 4 via the second interface 162, into the control signal CS with an Ethernet format, so that the control signal CS with the format converted (namely "the control signal with the Ethernet format") can be sent to the Ethernet power circuit 14 via the first interface 161 for the control operation of the camera 2. In practice, a two-way signal transmission including the control signal CS and the data signal DA can be performed between the working system 4 and the camera 2.

Figure 2:
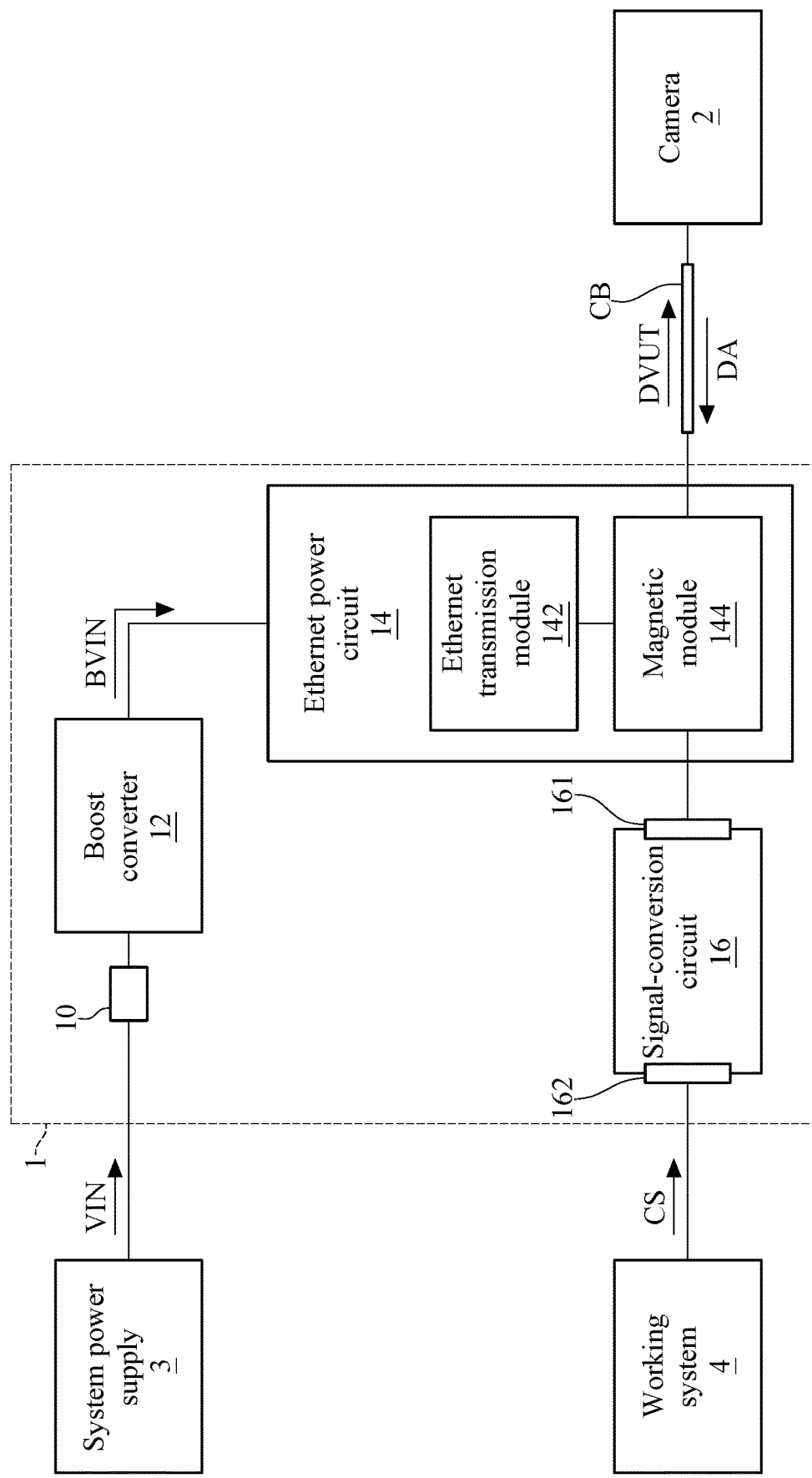
FIG. 2 is a detailed block diagram of the signal transmission device according to the embodiment of FIG. 1.

In summary, in the signal transmission device 1 of the present disclosure, the type of the working system 4 is different from the type of the Ethernet power circuit 14. In order to achieve the purpose of signal transmissions, the signal transmission device 1 is equipped with a signal-conversion circuit 16 serving as a conversion medium for properly converting the format of the data signal DA and the format of the control signal CS, so that signals can be delivered between the working system 4 and the Ethernet power circuit 14. Please further refer to FIG. 2, which is a detailed block diagram of the signal transmission device according to the embodiment of FIG. 1. The embodiment of FIG. 2 is similar to the embodiment of FIG. 1. The difference between FIG. 1 and FIG. 2 lies in that the Ethernet power circuit 14 shown in FIG. 2 includes an Ethernet transmission module 142 and a magnetic module 144.

In practice, the Ethernet transmission module 142 is connected to the boost converter 12 and the magnetic module 144. The Ethernet transmission module 142 and the magnetic module 144 are connected each other by using PCB layouts. The Ethernet transmission module 142 outputs a DC power to the magnetic module 144 according to the boosted power BVIN by using the technique of Power of Ethernet (PoE). Further, the magnetic module 144 outputs the DC power DVUT to the camera 2 via an Ethernet transmission cable according to the DC power which is outputted by the Ethernet transmission module 142. Moreover, an external power adaptor is required to provided power to the working system 4. In practice, a plurality of magnetic coils is disposed in the magnetic module 144 and adapted to filter signal noises. The magnetic module 144 has a plurality of connecting pins adapted to be connected to Ethernet cables for transmitting power signals, data signals or control signals. In this embodiment, since both of the Ethernet transmission module 142 and the magnetic module 144 are general components which persons skilled in the art are familiar with, details descriptions regarding the Ethernet transmission module 142 and the magnetic module 144 are not given.

Figure 3:
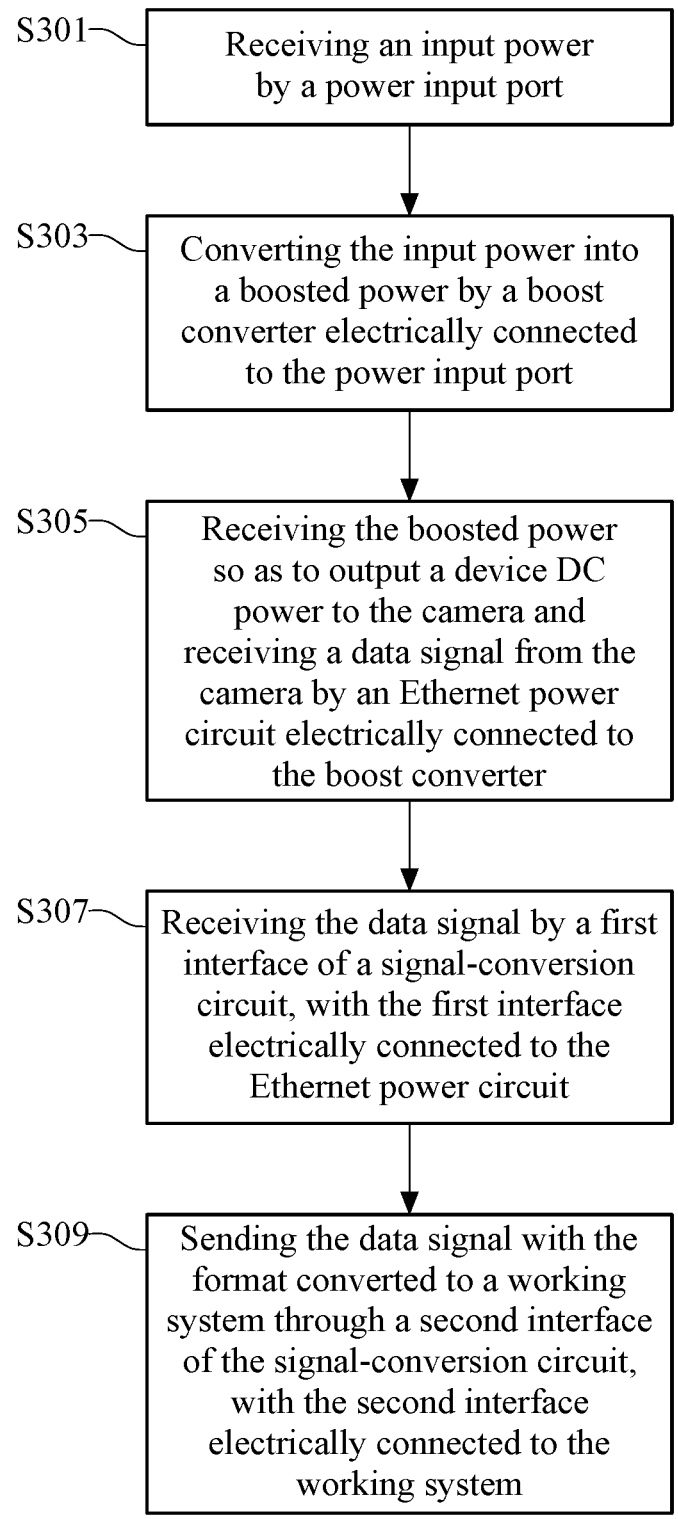
FIG. 3 is a flow chart of a signal transmission method according to one embodiment of the present disclosure.

Please further refer to FIG. 1 and FIG. 3. FIG. 3 is a flow chart of a signal transmission method according to one embodiment of the present disclosure. The transmission method can be implemented by the signal transmission device shown in FIG. 1 and/or FIG. 2. As show in the figures, in steps S301, an input power VIN is received by the power input port 10. In step S303, the input power VIN is converted into the boosted power BVIN by the boost converter 12 electrically connected to the power input port 10.

In step S305, the boosted power BVIN is received by the Ethernet power circuit 14 so as to output the DC power DVUT to the camera 2, and the data signal DA generated from the camera 2 is received by the Ethernet power circuit 14 which is electrically connected to the boost converter 12. In step S307, the data signal DA is received by the first interface 161 of the signal-conversion circuit 16, which is electrically connected to the Ethernet power circuit 14. In this embodiment, the format of the data signal DA is converted by the signal-conversion circuit 16. In step S309, the data signal DA with the format converted is sent to the working system 4 by the second interface 162 of the signal-conversion circuit 16, which is electrically connected to the working system 4. In this embodiment, the type of the first interface 161 is different from the type of the second interface 162. For example, the first interface 161 is an Ethernet transmission interface, and the second interface 162 is a PCIe transmission interface. However, type of transmission interfaces of the present disclosure is not limited to the above example.

In one embodiment, in addition to the aforementioned steps, the signal transmission method includes the control signal CS from the working system 4 is received via the second interface 162 of the signal-conversion circuit 16 and the control signal CS is further sent to the Ethernet power circuit 14 via the first interface 161 of the signal-conversion circuit 16 for controlling the operation of the camera 2. In one embodiment, the signal-conversion circuit 16 is configured to convert the data signal with the Ethernet-type format, received through the first interface, into the data signal with the PCIe-type format and further output the data signal with the PCIe-type format through the second interface. The conversions of the signal formats shown in the above embodiment are merely used for illustration, and the signal transmission method disclosed in the present disclosure is not limited to the embodiment. The detailed contents regarding the transmission of power and data performed by the signal transmission device using the signal transmission method has been disclosed in the aforementioned descriptions, so no more repeated here.

Based on the above descriptions, in the signal transmission device and the signal transmission disclosed in the present disclosure, by using an Ethernet circuit and an interface transformation for a signal transmission, so that a system is capable of outputting a power to a camera incompatible to the system and data transmissions between the system and the camera are achieved. Thereby, general circuit boards can be applied to cameras with the PoE interface in the security control industry, so that the multi-usability of products is increased.

What is claimed is:

1. A signal transmission device adapted to a camera, comprising:
   a power input port configured to receive an input power;
   a boost converter electrically connected to the power input port and configured to convert the input power to a boosted power;
   an Ethernet power circuit electrically connected to the boost converter, with the Ethernet power circuit configured to receive the boosted power so as to output a DC power to the camera and configured to receive a data signal generated by the camera; and
   a signal-conversion circuit having a first interface and a second interface, with a type of the first interface different from a type of the second interface, the first interface configured to be electrically connected to the Ethernet power circuit, the second interface configured to be electrically connected to a working system, the signal-conversion circuit configured to receive the data signal through the first interface and convert a format of the data signal, the signal-conversion circuit further configured to send the data signal with the format converted to the working system through the second interface;
   wherein the signal-conversion circuit is configured to convert the data signal with an Ethernet-type format received through the first interface into the data signal with a PCIe-type format and further output the signal with the PCIe-type format through the second interface.

2. The signal transmission device according to claim 1, wherein the first interface is an Ethernet transmission interface and the second interface is a PCIe transmission interface.

3. The signal transmission device according to claim 1, wherein the signal-conversion circuit is further configured to receive a control signal from the working system through the second interface and further send the control signal to the Ethernet power circuit through the first interface so as to control an operation of the camera.

4. A signal transmission method adapted to a camera, comprising:
   receiving an input power by a power input port;
   converting the input power into a boosted power by a boost converter electrically connected to the power input port;
   receiving the boosted power so as to output a DC power to the camera and receiving a data signal from the camera by an Ethernet power circuit electrically connected to the boost converter;
   receiving the data signal by a first interface of a signal-conversion circuit, with the first interface electrically connected to the Ethernet power circuit, wherein a format of the data signal is converted by the signal-conversion circuit; and
   sending the data signal with the format converted to a working system through a second interface of the signal-conversion circuit, with the second interface electrically connected to the working system;
   wherein a type of the first interface is different from a type of the second interface, the signal-conversion circuit is configured to convert the data signal with an Ethernet-type format received through the first interface into the data signal with a PCIe-type format and further output the data signal with the PCIe-type format through the second interface.

5. The signal transmission method according to claim 4, wherein the first interface is an Ethernet transmission interface and the second interface is a PCIe transmission interface.

6. The signal transmission method according to claim 4, further comprising:
   receiving a control signal from the working system via the second interface of the signal-conversion circuit and further sending the control signal to the Ethernet power circuit via the first interface of the signal-conversion circuit for controlling an operation of the camera.

* * * * *